US012386355B2

(12) United States Patent
Suzuki

(10) Patent No.: US 12,386,355 B2
(45) Date of Patent: Aug. 12, 2025

(54) ROUTE GENERATION METHOD, DEVICE, AND PROGRAM FOR A WORK VEHICLE OPERATING IN A NARROW AREA

(71) Applicant: Yanmar Holdings Co., Ltd., Osaka (JP)

(72) Inventor: Akihiro Suzuki, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 330 days.

(21) Appl. No.: 17/824,950

(22) Filed: May 26, 2022

(65) Prior Publication Data

US 2022/0382291 A1 Dec. 1, 2022

(30) Foreign Application Priority Data

May 31, 2021 (JP) ................. 2021-091521

(51) Int. Cl.
*G05D 1/00* (2024.01)
*A01M 7/00* (2006.01)

(52) U.S. Cl.
CPC ......... *G05D 1/0219* (2013.01); *A01M 7/0089* (2013.01)

(58) Field of Classification Search
None
See application file for complete search history.

(56) References Cited

U.S. PATENT DOCUMENTS

| | | | |
|---|---|---|---|
| 2017/0227969 A1* | 8/2017 | Murray | A01D 42/00 |
| 2018/0321683 A1* | 11/2018 | Foster | G05D 1/0221 |
| 2022/0167543 A1* | 6/2022 | Bast | G05D 1/0223 |

\* cited by examiner

*Primary Examiner* — James J Lee
*Assistant Examiner* — Jonathan E Reinert
(74) *Attorney, Agent, or Firm* — Chris Mizumoto

(57) ABSTRACT

A route generation method executes generating a plurality of work routes where a work vehicle travels straight in a first direction that is a travel direction of the work vehicle, in a work area where a crop is arranged, generating a movement route that is a route continuous with the work route and that includes a straight route where the work vehicle travels straight, in a headland area adjacent to the work area in the first direction, in non-work areas surrounding the work area, where the crop is not arranged, and generating a movement route that is a single route continuous with the movement route and that guides the work vehicle to each of the plurality of work routes.

11 Claims, 14 Drawing Sheets

ROUTE GENERATION METHOD, DEVICE, AND PROGRAM FOR A WORK VEHICLE OPERATING IN A NARROW AREA

CROSS-REFERENCE

This application claims foreign priority of JP2021-091521 filed May 31, 2021, the disclosure of which is hereby incorporated by reference in its entirety.

TECHNICAL FIELD

This invention relates to a route generation method, a route generation device, and a route generation program for generating a target route for a traveling vehicle that autonomously travels in a travel area.

BACKGROUND ART

Work vehicles that travel autonomously while spraying a chemical solution on crops planted in fields, farms, and other work areas are known (see, for example, Patent Document 1). For example, the aforementioned work vehicle travels autonomously along a target route that is pre-generated on the basis of information such as the shape of the field, the position of the crop, and the content of the work.

PRIOR ART DOCUMENT

Patent Document

Patent Document 1: Japanese Patent Application Publication No. 2021-000021

SUMMARY OF INVENTION

Technical Problem

Here, in a case of a field with a narrow headland area, the aforementioned work vehicle may not be able to turn properly when moving in a crop row. For example, in a field where a headland area is narrow and a sufficient turning area cannot be secured, when the aforementioned work vehicle makes a turn (for example, 180-degree turn) in the headland area to finish the work of the first crop row and enter the next second crop row, the aforementioned work vehicle may deviate out of the field. With a conventional technique, it is difficult to generate an appropriate target route for such a field.

An object of the present invention relates to a route generation method, a route generation device, and a route generation program capable of appropriately generating a target route in a field where a sufficient turning area cannot be secured.

Solution to Problem

A route generation method according to the present invention is a method that executes generating a plurality of work routes where a work vehicle travels straight in a first direction that is a travel direction of the work vehicle, in a work area where a work object is arranged, generating a first movement route that is a route continuous with the work route and that includes a straight route where the work vehicle travels straight, in a first non-work area adjacent to the work area in the first direction, in non-work areas surrounding the work area, where the work object is not arranged, and generating a second movement route that is a single route continuous with the first movement route and that guides the work vehicle to each of the plurality of work routes.

A route generation device according to the present invention includes a route generation processor. The route generation processor generates a plurality of work routes where the work vehicle travels straight in the first direction that is a travel direction of the work vehicle, in the work area where a work object is arranged. Further, the route generation processor generates a first movement route that is a route continuous with the work route and that includes a straight route where the work vehicle travels straight, in a first non-work area adjacent to the work area in the first direction, in non-work areas surrounding the work area, where the work object is not arranged. Further, the route generation processor generates a second movement route that is a single route continuous with the first movement route and that guides the work vehicle to each of the plurality of work routes.

A route generation program according to the present invention is a program for causing one or more processors to execute generating a plurality of work routes where a work vehicle travels straight in a first direction that is a travel direction of the work vehicle, in a work area where a work object is arranged, generating a first movement route that is a route continuous with the work route and that includes a straight route where the work vehicle travels straight, in a first non-work area adjacent to the work area in the first direction, in non-work areas surrounding the work area, where the work object is not arranged, and generating a second movement route that is a single route continuous with the first movement route and that guides the work vehicle to each of the plurality of work routes.

Advantageous Effects of Invention

According to the present invention, it is possible to provide a route generation method, a route generation device, and a route generation program capable of appropriately generating a target route in a field where a sufficient turning area cannot be secured.

DESCRIPTION OF EMBODIMENTS

The embodiments described below are examples of embodiments of the present invention and do not limit the technical scope of the present invention.

[Autonomous Travel System 1]

Figure 1:
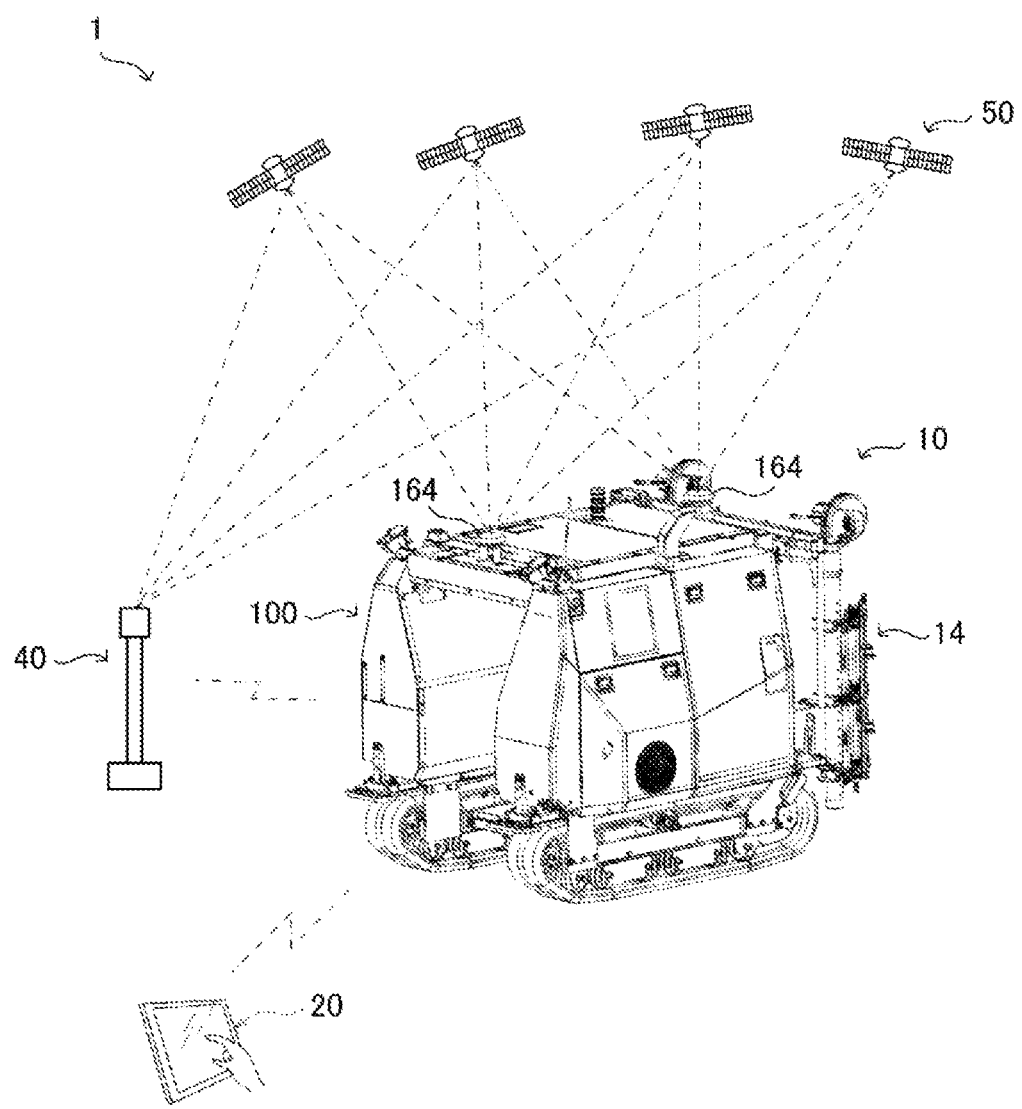
FIG. 1 is a schematic diagram illustrating an overall configuration of an autonomous travel system according to an embodiment of the present invention.
Figure 2:
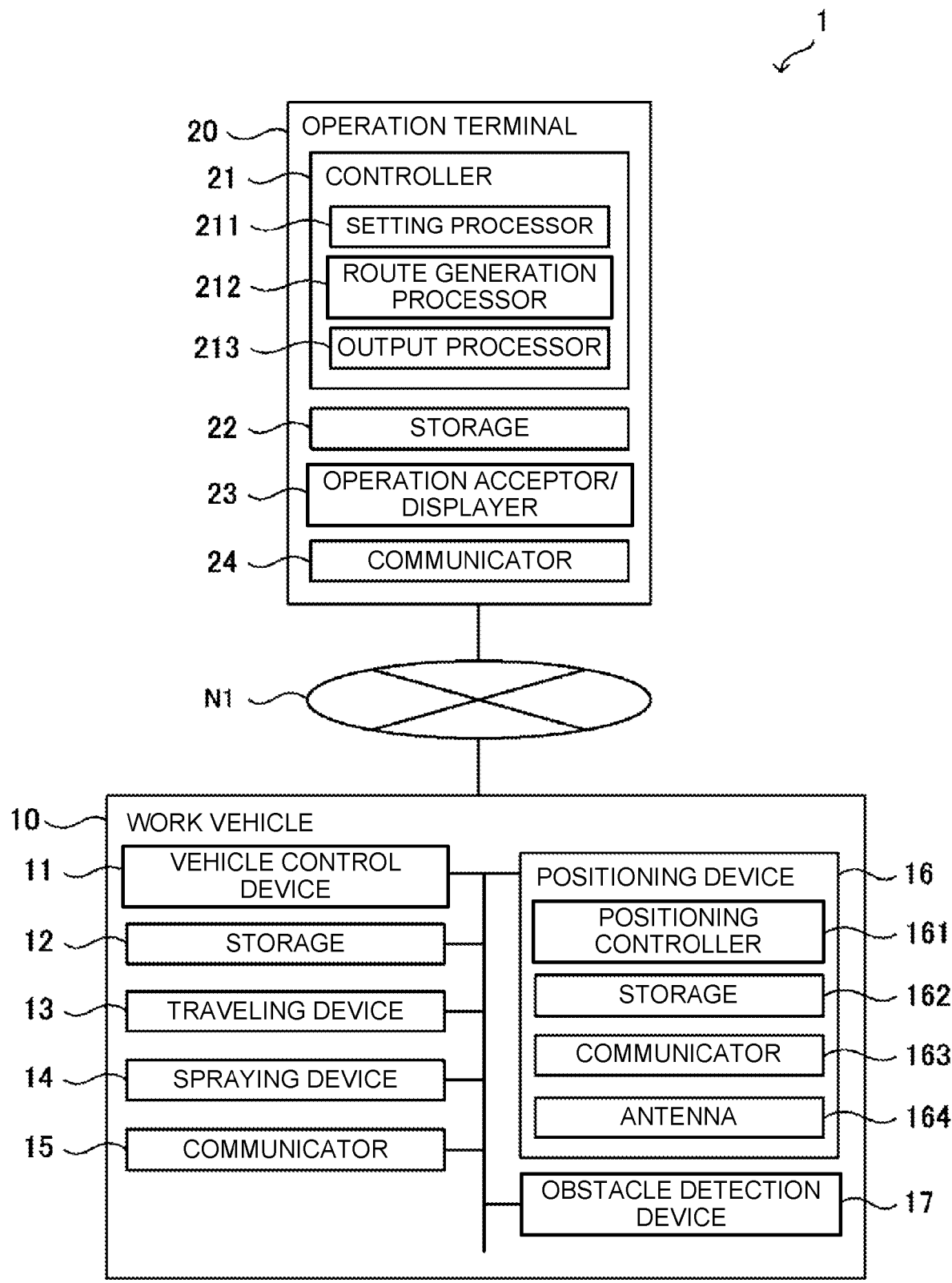
FIG. 2 is a block diagram illustrating a configuration of the autonomous travel system according to the embodiment of the present invention.

As illustrated in FIGS. 1 and 2, an autonomous travel system 1 according to an embodiment of the present invention includes a work vehicle 10, an operation terminal 20, a base station 40, and a satellite 50. The work vehicle 10 and the operation terminal 20 can communicate via a communication network N1. For example, the work vehicle 10 and the operation terminal 20 can communicate via a cellular telephone line network, a packet line network, or a wireless LAN.

In the present embodiment, a case where the work vehicle 10 is a vehicle that performs a spraying work to spray a chemical solution, water, or the like on a crop V (see FIG. 5) planted in a field F is taken as an example. The field F is, for example, an orchard such as a vineyard or an apple orchard. The crop V is, for example, the fruit tree of a grape. The spraying work described above is, for example, the spraying of a chemical solution, water, or the like on the crop V. In other embodiments, the work vehicle 10 may be a vehicle for weeding, leaf cutting, or harvesting.

Figure 5:
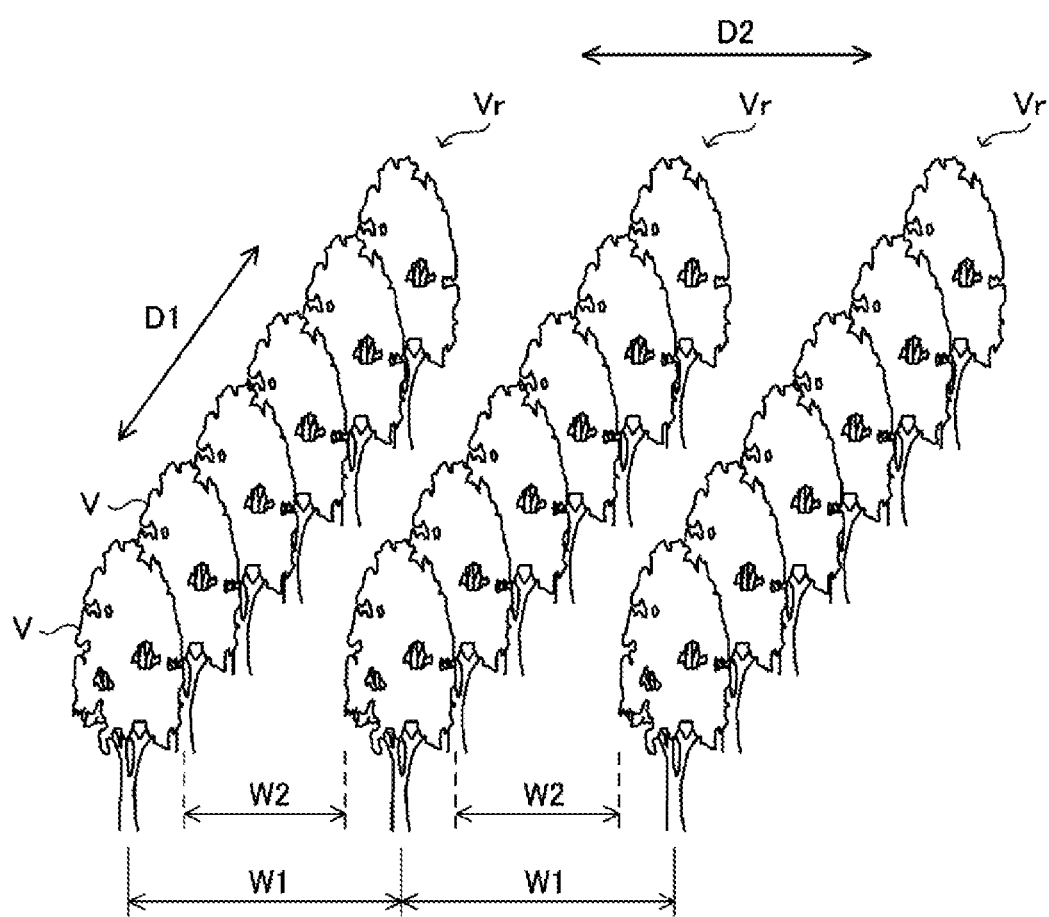
FIG. 5 is a diagram illustrating an example of a crop row according to the embodiment of the present invention.

The crop V is arranged in multiple rows at predetermined intervals in the field F. Specifically, as illustrated in FIG. 5, a plurality of crops V are planted in a straight line in a predetermined direction (direction D1), constituting a crop row Vr that includes a plurality of crops V in a straight line. FIG. 5 illustrates an example of three crop rows Vr. Each crop row Vr is arranged with a predetermined interval W1 in a row direction (direction D2). The area (space) of an interval W2 between adjacent crop rows Vr is the work passage where the work vehicle 10 performs the spraying work on the crop V while traveling in the direction D1.

Figure 6:
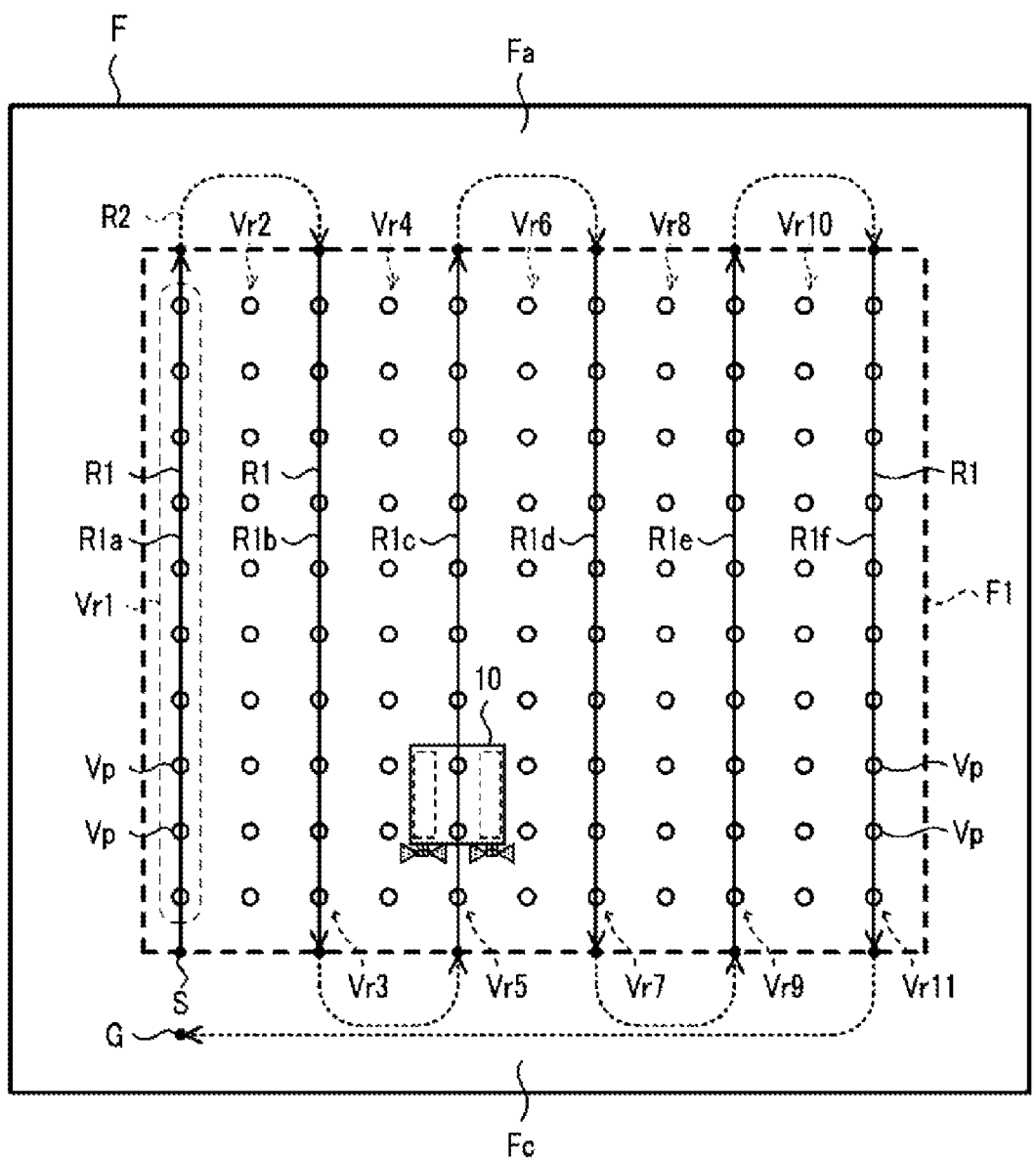
FIG. 6 is a diagram illustrating an example of a target route in a first route generation mode according to the embodiment of the present invention.

Further, the work vehicle 10 can also travel automatically (autonomously) along a predetermined target route R. For example, as illustrated in FIG. 6, the work vehicle 10 autonomously travels along the target route R including a work route R1 (work routes R1a to R1f) and a movement route R2, from a work start position S to a work end position G. The work route R1 is a straight line route on which the work vehicle 10 performs a spraying work on the crop V, and the movement route R2 is a straight line route on which the work vehicle 10 moves between the crop rows Vr without performing the spraying work. The movement route R2 includes, for example, a turning route and a straight route. In the example illustrated in FIG. 6, crops V consisting of crop rows Vr1 to Vr11 are arranged in the field F. In FIG. 6, a position where the crop V is planted (crop position) is represented by "Vp". Further, the work vehicle 10 traveling in the field F in FIG. 6 has a gantry-shaped vehicle body 100 (see FIG. 4C), and sprays a chemical solution on the crop V of the crop row Vr and a crop row Vr adjacent to the crop row Vr while traveling over one crop row Vr. For example, as illustrated in FIG. 6, when the work vehicle 10 travels over the crop row Vr5, the left side body (left side section 100L) of the work vehicle 10 travels in the work passage between crop rows Vr4 and Vr5, and the right side body (right side section 100R) of the work vehicle 10 travels in the work passage between the crop rows Vr5 and Vr6, and sprays a chemical solution on the crop V in the crop rows Vr4, Vr5, and Vr6.

Further, the work vehicle 10 travels autonomously in a predetermined row order. For example, the work vehicle 10 travels over the crop row Vr1, then over the crop row Vr3, then over the crop row Vr5. In this way, the work vehicle 10 performs autonomous traveling in accordance with a preset crop row Vr order. The work vehicle 10 may travel one row at a time in the order in which the crop rows Vr are arranged, or may travel every other row of a plurality of rows.

The satellite 50 is a positioning satellite that constitutes a satellite positioning system such as GNSS (Global Navigation Satellite System), and transmits a GNSS signal (satellite signal). The base station 40 is a reference point (reference station) that constitutes the satellite positioning system. The base station 40 transmits correction information to the work vehicle 10 to calculate the current position of the work vehicle 10.

The positioning device 16 mounted on the work vehicle 10 executes positioning processing that calculates the current position (latitude, longitude, and altitude) and the current orientation of the work vehicle 10 with the use of the GNSS signal transmitted from the satellite 50. Specifically, the positioning device 16 measures the position of the work vehicle 10 with the use of an RTK (Real Time Kinematic) method or the like for measuring the position of the work vehicle 10 on the basis of the positioning information (GNSS signal, etc.) received by two receivers (antenna 164 and base station 40) and the correction information generated by the base station 40. The aforementioned positioning method is a well-known technique, and thus the detailed description is omitted.

The following is a detailed description of each component of the autonomous travel system 1.

[Work Vehicle 10]

Figure 3:
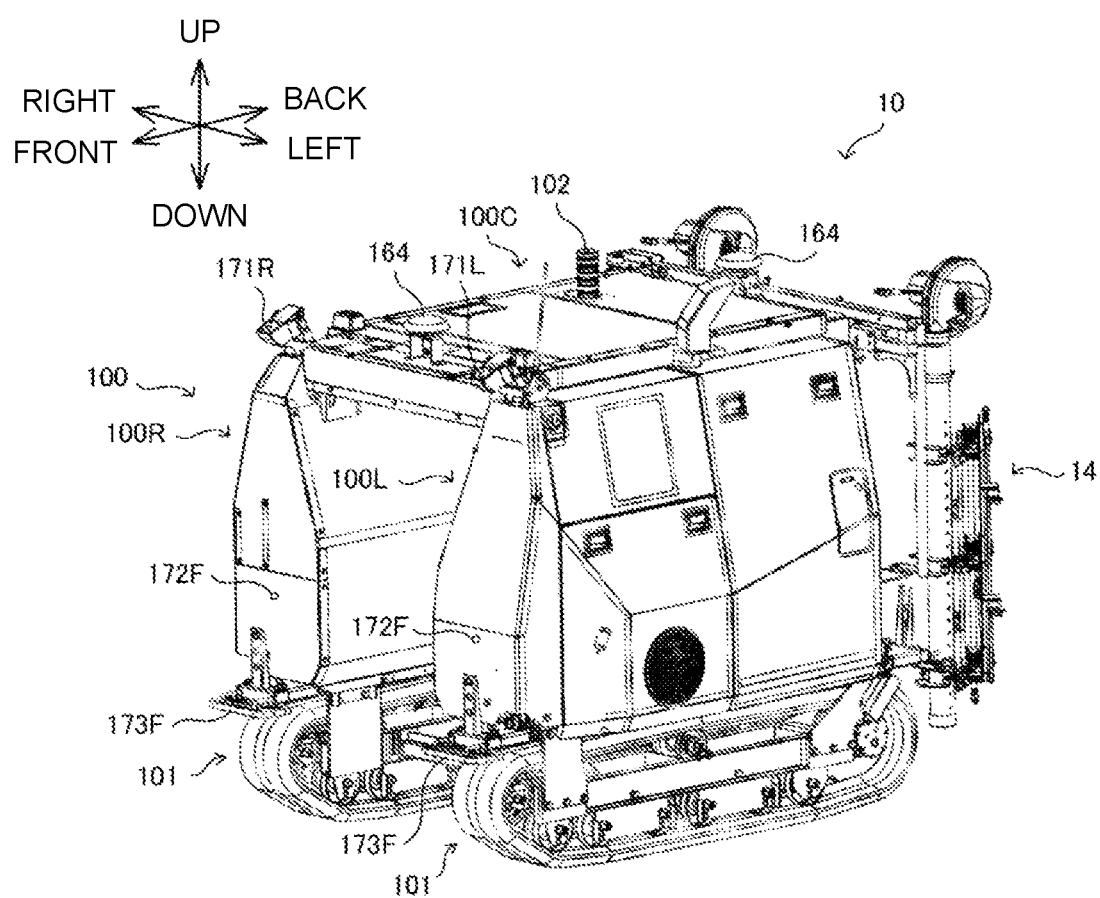
FIG. 3 is an external view of a work vehicle according to the embodiment of the present invention, viewed from the left front side.
Figure 4A:
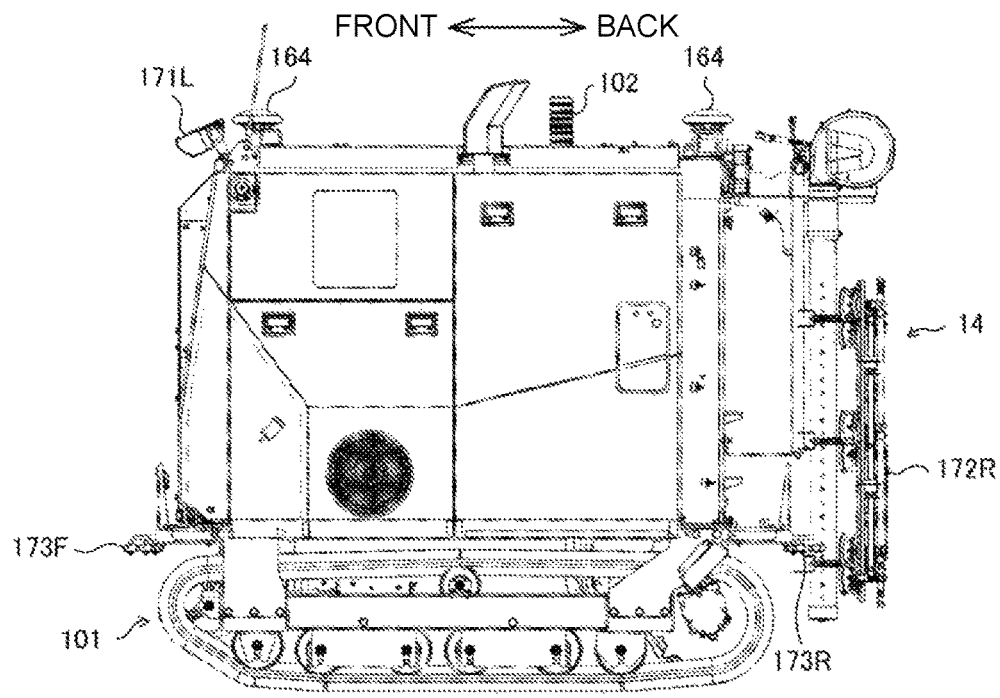
FIG. 4A is an external view of the left side of the work vehicle according to the embodiment of the present invention, viewed from the left side.
Figure 4B:
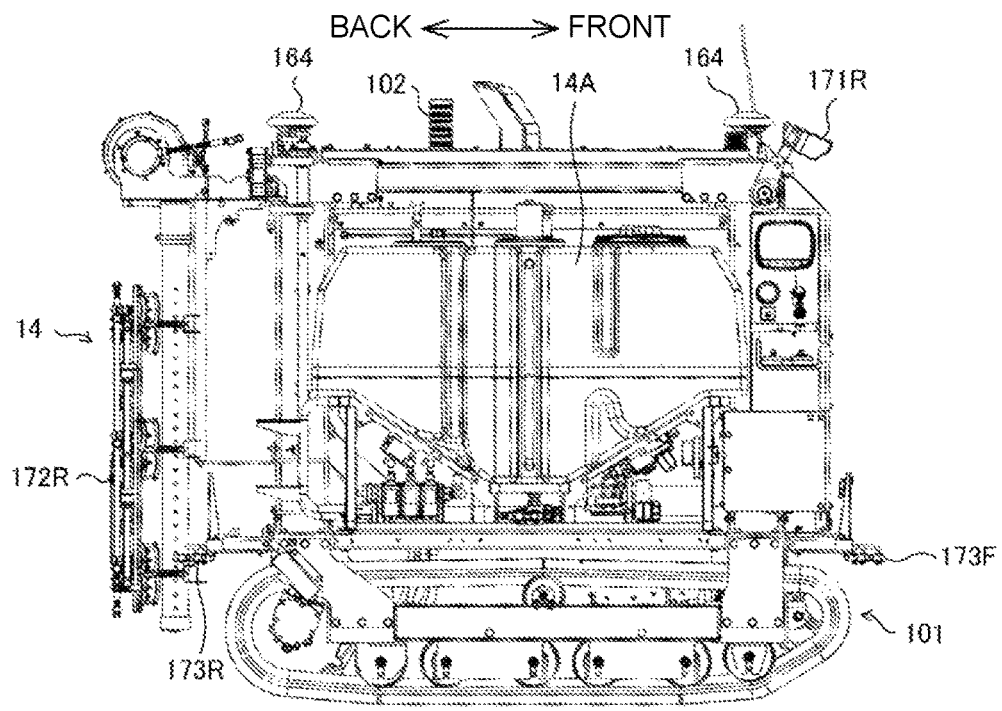
FIG. 4B is an external view of the right side of the work vehicle according to the embodiment of the present invention, viewed from the right side.
Figure 4C:
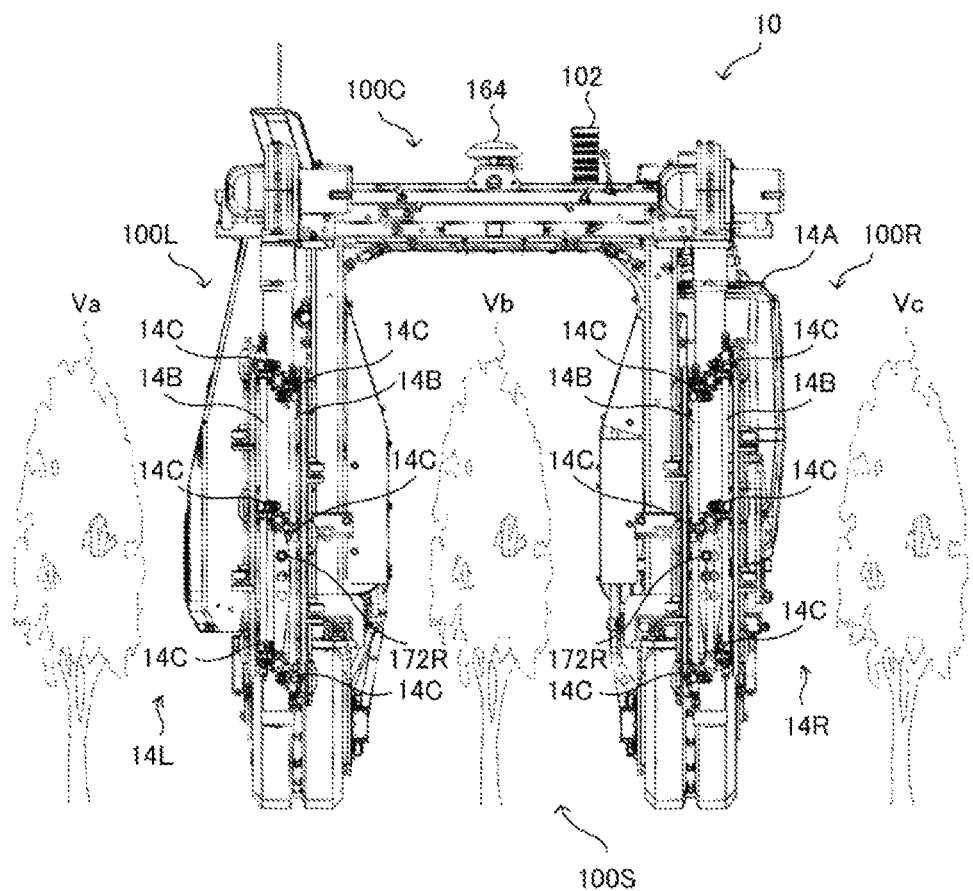
FIG. 4C is an external view of the back side of the work vehicle according to the embodiment of the present invention, viewed from the back side.

FIG. 3 is an external view of the work vehicle 10, viewed from the left front side. FIG. 4A is an external view of the left side of the work vehicle 10 viewed from the left side, FIG. 4B is an external view of the right side of the work vehicle 10 viewed from the right side, and FIG. 4C is an external view of the back side of the work vehicle 10 viewed from the back side.

As illustrated in FIGS. 1 to 4, the work vehicle 10 includes a vehicle control device 11, a storage 12, a traveling device 13, a spraying device 14, a communicator 15, a positioning device 16, and an obstacle detection device 17. The vehicle control device 11 is electrically connected to the storage 12, traveling device 13, spraying device 14, positioning device 16, obstacle detection device 17, and the like. The vehicle control device 11 and the positioning device 16 may be capable of wireless communication.

The communicator 15 is a communication interface for connecting the work vehicle 10 to the communication network N1 by wire or wirelessly and for executing data communication according to a predetermined communication protocol with external devices such as the operation terminal 20 via the communication network N1.

The storage 12 is a non-volatile storage unit such as an HDD (Hard Disk Drive) or an SSD (Solid State Drive) that stores various types of information. The storage 12 stores control programs such as an autonomous traveling program to cause the vehicle control device 11 perform autonomous travel processing (see FIG. 11) described below. For example, the autonomous traveling program is non-transiently recorded on a computer-readable recording medium, such as a CD and a DVD, and is read by a predetermined reading device (not illustrated) and stored in the storage 12. The aforementioned autonomous traveling program may be downloaded from a server (not illustrated) to the work vehicle 10 via the communication network N1 and stored in the storage 12. Further, the storage 12 stores route data including information on the target route R generated at the operation terminal 20. For example, the aforementioned route data is transferred from the operation terminal 20 to the work vehicle 10 and stored in the storage 12.

Here, the work vehicle 10 includes a gantry-shaped vehicle body 100 that travels over crops V (fruit trees) planted in multiple rows in the field F. As illustrated in FIG. 4C, the vehicle body 100 is formed in a gantry shape by a left side section 100L, a right side section 100R, and a connection section 100C connecting the left side section 100L and right side section 100R. A space 100S that allows the passage of the crop V is secured inside the left side section 100L, the right side section 100R, and the connection section 100C.

Crawlers 101 are provided at the lower end of each of the left side section 100L and right side section 100R of the vehicle body 100. An engine (not illustrated) and a battery (not illustrated) are provided on the left side section 100L. A storage tank 14A (see FIG. 4B) and the like of the spraying device 14 are provided on the right side section 100R. In this way, by distributing and arranging the components on the left side section 100L and the right side section 100R of the vehicle body 100, the balance between the right and left is equilibrated and the center of gravity is lowered in the work vehicle 10. As a result, the work vehicle 10 can travel stably on slopes and other surfaces in the field F.

The traveling device 13 is the driver that drives the work vehicle 10. The traveling device 13 includes an engine, the crawlers 101, and the like.

The right and left crawlers 101 are driven by power from the engine with independent speed changes possible through a hydrostatic stepless transmission device. Accordingly, the vehicle body 100 is brought into a state of traveling straight in the forward-traveling direction by driving the right and left crawlers 101 at an even speed in the forward-traveling direction and is brought into a state of traveling straight in the backward-traveling direction by driving the right and left crawlers 101 at an even speed in the backward-traveling direction. Further, the vehicle body 100 is brought into a state of turning while traveling forward by driving the right and left crawlers 101 at an uneven speed in the forward-traveling direction and is brought into a state of turning while traveling backward by driving the right and left crawlers 101 at an uneven speed in the backward-traveling direction. Further, the vehicle body 100 is brought into a pivot turn (pivotal brake turn) state by driving one of the right and left crawlers 101 while the driving of the other crawler 101 is stopped, and is brought into a spin turn state (ultra-pivotal turn) by driving the right and left crawlers 101 at an even speed in the forward-traveling direction and the backward-traveling direction. Further, the vehicle body 100 is brought to a traveling stopped state by stopping the driving of the right and left crawlers 101. The right and left crawlers 101 may be configured so as to be electrically driven by an electric motor.

As illustrated in FIG. 4C, the spraying device 14 includes a storage tank 14A that stores a chemical solution or the like, a spraying pump (not illustrated) that pumps the chemical solution or the like, an electric spraying motor (not illustrated) that drives the spraying pump, two spray pipes 14B provided in parallel on the right and left on the back of the vehicle body 100 in a vertical position, a total of 12 spray nozzles 14C, three provided for each spray pipe 14B, an electronically controlled valve unit (not illustrated) that changes the amount and pattern of spraying the chemical solution or the like, and a plurality of spraying pipes (not illustrated) connecting these.

Each spray nozzle 14C is attached to the corresponding spray pipe 14B in a vertically repositionable manner. This allows each spray nozzle 14C to change the interval between adjacent spray nozzles 14C and the height position with respect to the spray pipe 14B in accordance with the object to be sprayed (crop V). Further, each spray nozzle 14C is attached in such a manner that the height position and right/left position with respect to the vehicle body 100 can be changed in accordance with the object to be sprayed.

In the spraying device 14, the number of the spray nozzles 14C provided in each spray pipe 14B can be changed in various ways depending on the type of crop V, the length of each spray pipe 14B, and other factors.

As illustrated in FIG. 4C, of the plurality of spray nozzles 14C, three spray nozzles 14C provided on the leftmost spray pipe 14B spray the chemical solution to the left toward the crop Va located on the left outer side of the vehicle body 100. Of the plurality of spray nozzles 14C, three spray nozzles 14C provided on the left inner spray pipe 14B adjacent to the leftmost spray pipe 14B spray the chemical solution to the right toward a crop Vb located in the space 100S at the center of the right and left sides of the vehicle body 100. Of the plurality of spray nozzles 14C, three spray nozzles 14C provided on the rightmost spray pipe 14B spray the chemical solution to the right toward a crop Vc located on the right outer side of the vehicle body 100. Of the plurality of spray nozzles 14C, three spray nozzles 14C provided on the right inner spray pipe 14B adjacent to the rightmost spray pipe 14B spray the chemical solution to the left toward the crop Vb located in the space 100S.

With the above configuration, in the spraying device 14, the two spray pipes 14B and six spray nozzles 14C on the left side section 100L of the vehicle body 100 function as a left side sprayer 14L. Further, the two spray pipes 14B and six spray nozzles 14C on the right side section 100R of the vehicle body 100 function as a right side sprayer 14R. In addition, the right and left sprayers 14L and 14R are disposed on the back of the vehicle body 100 with a right-left interval that allows the passage of the crop Vb (space 100S) between the right and left sprayers 14L and 14R in the state of being able to spray in the right-left directions.

In the spraying device 14, the spray patterns by the sprayers 14L and 14R include a 4-way spray pattern where each of the sprayers 14L and 14R sprays the chemical solution in both the right and left directions, and a direction-limited spray pattern where the direction of the spray by the sprayers 14L and 14R is limited. The aforementioned direction-limited spray pattern includes a left side 3-way spray pattern where the sprayer 14L sprays the chemical solution in both right and left directions and the sprayer 14R sprays the chemical solution only in the left direction, a right side 3-way spray pattern where the sprayer 14L sprays the chemical solution only in the right direction and the sprayer 14R sprays the chemical solution in both right and left directions, a 2-way spray pattern where the sprayer 14L sprays the chemical solution only in the right direction and the sprayer 14R sprays the chemical solution only in the left direction, a left side 1-way spray pattern where the sprayer 14L sprays only in the left direction and the sprayer 14R does not spray the chemical solution, and a right side 1-way spray pattern where the sprayer 14R sprays only in the right direction and the sprayer 14L does not spray the chemical solution.

Mounted on the vehicle body 100 are an autonomous traveling controller that causes the vehicle body 100 to autonomously travel along the target route R in the field F on the basis of positioning information or the like acquired from the positioning device 16, an engine controller that controls the engine, and an HST (Hydro-Static Transmission) controller that controls a hydrostatic stepless transmission device, and a work device controller that controls a work device such as the spraying device 14. Each controller is constructed by an electronic control unit equipped with a microcontroller or the like, various information, a control program, or the like stored in a non-volatile memory of the microcontroller (for example, EEPROM such as a flash memory). Various information stored in non-volatile memory may include a pre-generated target route R, and the like. In the present embodiment, the respective controllers are collectively referred to as the "vehicle control device 11" (see FIG. 2).

The positioning device 16 is a communication device equipped with a positioning controller 161, a storage 162, a communicator 163, an antenna 164, and the like. The antenna 164 is provided in front of and behind the ceiling of the vehicle body 100 (connection section 100C) (see FIG. 3). Further, the ceiling of the vehicle body 100 is also equipped with an indicator light 102 or the like that displays the traveling state of the work vehicle 10 (see FIG. 3). The aforementioned battery is connected to the positioning device 16, and the positioning device 16 can operate while the aforementioned engine is stopped.

The communicator 163 is a communication interface for connecting the positioning device 16 to the communication network N1 by wire or wirelessly and for executing data communication according to a predetermined communication protocol with external devices such as the base station 40 via the communication network N1.

The antenna 164 receives radio waves (GNSS signals) transmitted from satellites. Since the antenna 164 is provided in front of and behind the work vehicle 10, the current position and orientation of the work vehicle 10 can be accurately measured.

The positioning controller 161 is a computer system including one or more processors and a storage memory such as a non-volatile memory and a RAM. The storage 162 is a non-volatile memory or the like that stores control programs for causing the positioning controller 161 perform positioning processing, as well as data such as positioning information and movement information. The positioning controller 161 measures the current position and current orientation of the work vehicle 10 by a predetermined positioning method (RTK method, etc.) on the basis of GNSS signals that the antenna 164 receives from the satellite 50.

The obstacle detection device 17 includes a LiDAR sensor 171L on the front left side of the vehicle body 100 and a LiDAR sensor 171R on the front right side of the vehicle body 100 (see FIG. 3). Each LiDAR sensor measures the distance from the LiDAR sensor to each distance measurement point (object to be measured) in the measurement range by, for example, the TOF (Time Of Flight) method, in which the distance to the distance measurement point is measured on the basis of the round-trip time for a laser light emitted by the LiDAR sensor to return after reaching the distance measurement point.

For the LiDAR sensor 171L, a predetermined range on the front left side of the vehicle body 100 is set as the measurement range, and for the LiDAR sensor 171R, a predetermined range on the front right side of the vehicle body 100 is set as the measurement range. Each LiDAR sensor transmits measurement information to the vehicle control device 11, such as the distance to each distance measurement point and the scanning angle (coordinates) to each distance measurement point.

Further, the obstacle detection device 17 includes right and left ultrasonic sensors 172F (see FIG. 3) provided on the front side of the vehicle body 100 and right and left ultrasonic sensors 172R (see FIGS. 4A to 4C) provided on the rear side of the vehicle body 100. Each ultrasonic sensor measures the distance from the ultrasonic sensor to the distance measurement point by the TOF method, in which the distance to the distance measurement point is measured on the basis of the round-trip time for an ultrasonic wave transmitted by the ultrasonic sensor to return after reaching the distance measurement point.

For the ultrasonic sensor 172F on the front left side, a predetermined range on the front left side of the vehicle body 100 is set as the measurement range. For the ultrasonic sensor 172F on the front right side, a predetermined range on the front right side of the vehicle body 100 is set as the measurement range. For the ultrasonic sensor 172R on the rear left side, a predetermined range on the rear left side of the vehicle body 100 is set as the measurement range. For the ultrasonic sensor 172R on the rear right side, a predetermined range on the rear right side of the vehicle body 100 is set as the measurement range. Each ultrasonic sensor transmits the measurement information including the distance to the object to be measured and the direction of the object to be measured to the vehicle control device 11.

Further, the obstacle detection device 17 includes right and left contact sensors 173F (see FIG. 3) provided on the front side of the vehicle body 100 and right and left contact sensors 173R (see FIGS. 4A and 4B) provided on the rear side of the vehicle body 100. The contact sensor 173F on the front side of the vehicle body 100 detects an obstacle when the obstacle contacts the contact sensor 173F. In front of the contact sensor 173R on the rear side of the vehicle body 100 (rear side of the work vehicle 10), the spraying device 14 is provided. When an obstacle comes into contact with the spraying device 14, the contact sensor 173R detects the obstacle by the spraying device 14 moving to the rear (front side of the work vehicle 10). Each contact sensor transmits a detection signal to the vehicle control device 11 when detecting an obstacle.

The vehicle control device 11 executes avoidance processing to avoid obstacles when there is a possibility that the work vehicle 10 may collide with an obstacle, on the basis of measurement information on the obstacle acquired from the obstacle detection device 17.

The vehicle control device 11 includes control devices such as a CPU, a ROM, and a RAM. The aforementioned CPU is a processor that performs various arithmetic operations. The aforementioned ROM is a non-volatile storage in which control programs such as a BIOS and an OS for causing the CPU to execute various types of arithmetic processing are stored in advance. The aforementioned RAM is a volatile or non-volatile storage that stores various information, and is used as a temporary storage memory (work area) for various types of processing executed by the CPU. In addition, the vehicle control device 11 controls the work vehicle 10 by executing various control programs stored in advance in the aforementioned ROM or the storage 12 by the CPU.

The vehicle control device 11 controls the travel of the work vehicle 10. Specifically, the vehicle control device 11 causes the work vehicle 10 to autonomously travel along the target route R on the basis of position information indicating the position of the work vehicle 10 measured by the positioning device 16. For example, when the aforementioned state becomes RTK positioning available and the operator presses the start button on the operation terminal 20, the operation terminal 20 outputs a work start instruction to the work vehicle 10. When acquiring the work start instruction from the operation terminal 20, the vehicle control device 11 starts the autonomous traveling of the work vehicle 10 on the basis of the position information indicating the position of the work vehicle 10 measured by the positioning device 16. As a result, the work vehicle 10 starts autonomous traveling along the target route R and starts a spraying work by the spraying device 14 in the work passage.

Further, the vehicle control device 11 stops the autonomous traveling of the work vehicle 10 when acquiring a travel stop instruction from the operation terminal 20. For example, when the operator presses the stop button on the operation screen of the operation terminal 20, the operation terminal 20 outputs the aforementioned travel stop instruction to the work vehicle 10. The vehicle control device 11 stops the autonomous traveling of the work vehicle 10 when acquiring the aforementioned travel stop instruction from the operation terminal 20. This causes the work vehicle 10 to stop its autonomous traveling and the spraying work by the spraying device 14.

The above configuration allows the work vehicle 10 to travel autonomously with high precision along the target route R, and also allows the spraying of a chemical solution or the like by the spraying device 14 to be performed properly.

The configuration of the work vehicle 10 described above is a configuration example of the work vehicle of the present invention, and the present invention is not limited to the configuration described above. The work vehicle 10 described above is a vehicle that can perform a spraying work in which a sprayed object is sprayed on a first crop row Vr and a second crop row Vr in each of the right-left directions of the first crop row Vr while traveling over the first crop row Vr. As another embodiment, the work vehicle 10 may have a normal shape in which the entire vehicle body 100 travels between the crop rows Vr (work passages) instead of the gantry shape of the vehicle body 100. In this case, the work vehicle 10 autonomously travels in each work passage without straddling the crop row Vr. Further, the spraying device 14 includes one sprayer, and switches among a spray pattern that sprays a chemical solution in right and left directions, a spray pattern that sprays the chemical solution only to the left, and a spray pattern that sprays the chemical solution only to the right, to perform the spraying work.

[Operation Terminal 20]

As illustrated in FIG. 2, the operation terminal 20 is an information processing apparatus that includes a controller 21, a storage 22, an operation acceptor/displayer 23, a communicator 24, and the like. The operation terminal 20 may include a portable terminal such as a tablet device, and a smartphone. The operation terminal 20 is an example of the route generation device of the present invention.

The communicator 24 is a communication interface for connecting the operation terminal 20 to the communication network N1 by wire or wirelessly and for executing data communication according to a predetermined communication protocol with one or more external devices such as the work vehicle 10 via the communication network N1.

The operation acceptor/displayer 23 is a user interface that includes a display such as an LCD or an organic EL display that displays various types of information and an operation acceptor such as a touch panel, mouse, and keyboard that accepts operations. The operator can operate the aforementioned operation acceptor to register various types of information (work vehicle information, field information, work information, etc., as described below) on the operation screen displayed on the aforementioned display. Further, the operator can also operate the aforementioned operation acceptor to give work start and travel stop instructions to the work vehicle 10. Furthermore, the operator, at a distance from the work vehicle 10, can grasp the traveling state, working condition, and surrounding situation of the work vehicle 10 that autonomously travels in the field F along the target route R, on the basis of the traveling locus displayed on the operation terminal 20 and the surrounding image of the vehicle body 100.

The storage 22 is a non-volatile storage such as an HDD or an SSD that stores various types of information. The storage 22 stores control programs such as an autonomous traveling program (route generation program) to cause the controller 21 perform autonomous travel processing (see FIG. 11) including route generation processing described below. For example, the aforementioned autonomous traveling program is non-transiently recorded on a computer-readable recording medium such as a CD and a DVD, and is read by a predetermined reading device (not illustrated) and stored in the storage 22. The aforementioned autonomous traveling program may be downloaded from a server (not illustrated) to the operation terminal 20 via the communication network N1 and stored in the storage 22.

The controller 21 includes control devices such as a CPU, a ROM, and a RAM. The aforementioned CPU is a processor that performs various arithmetic operations. The aforementioned ROM is a non-volatile storage in which control programs such as a BIOS and an OS for causing the CPU to execute various types of arithmetic processing are stored in advance. The aforementioned RAM is a volatile or non-volatile storage that stores various information, and is used as a temporary storage memory (work area) for various types of processing executed by the CPU. In addition, the controller 21 controls the operation terminal 20 by executing various control programs stored in advance in the ROM or the storage 22 by the CPU.

Figure 8:
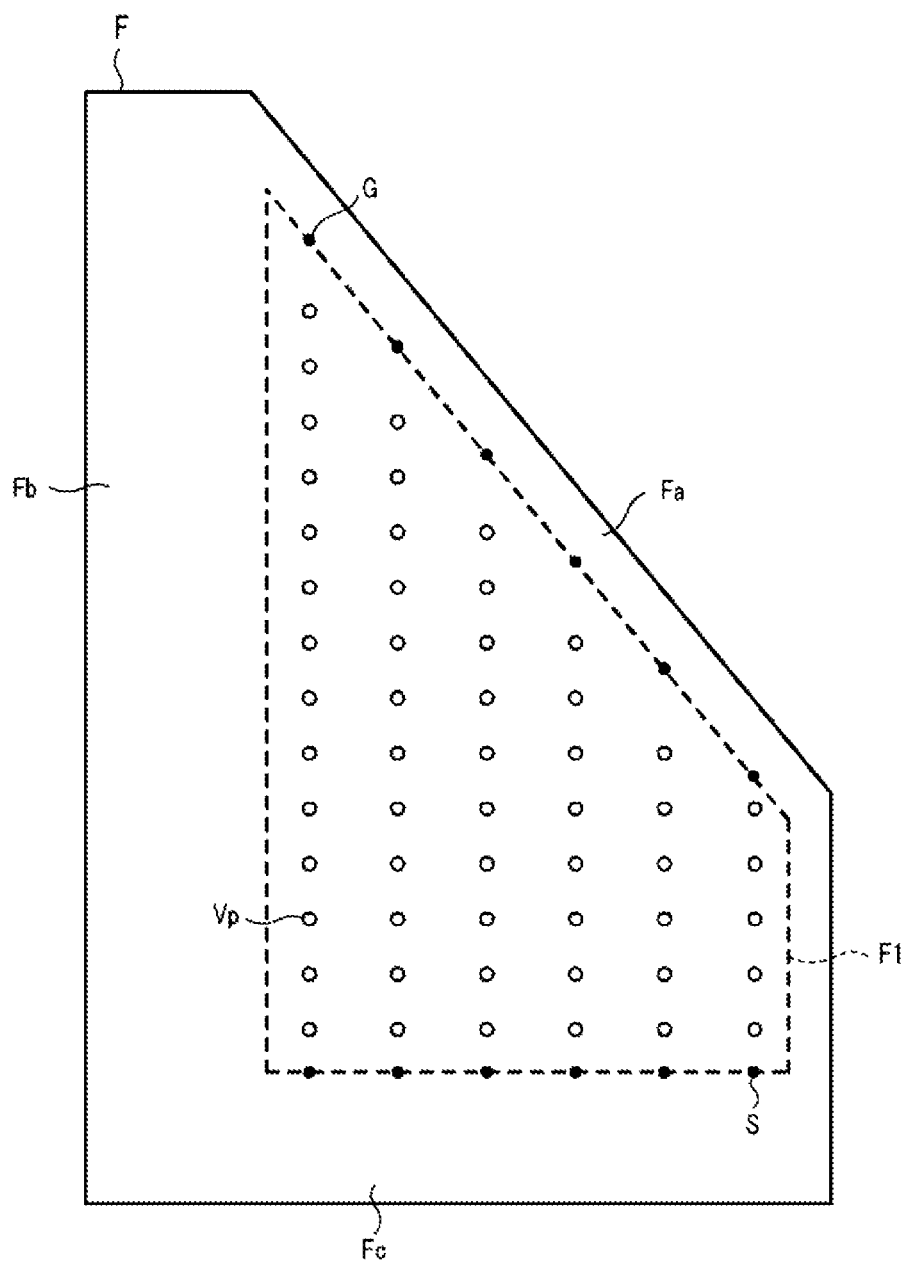
FIG. 8 is a diagram illustrating an example of a field according to the embodiment of the present invention.

In the case of a field F with a narrow headland area, the work vehicle 10 may not be able to turn properly when moving in the crop row Vr. For example, as illustrated in FIG. 8, in a field F where a headland area Fa is narrow and a sufficient turning area cannot be secured, when the work vehicle 10 makes a turn (for example, 180-degree turn) in the headland area Fa to finish the work of the first crop row and enter the next second crop row, the work vehicle 10 may deviate out of the field. With a conventional technique, it is difficult to generate an appropriate target route R for such a field F. In contrast, the operation terminal 20 according to the present embodiment can generate a target route R appropriately in the field F where a sufficient turning area cannot be secured.

In FIG. 8, a sign F1 represents a work area where the crop V is arranged, and signs Fa and Fc represent a headland area where the work vehicle 10 turns (turning area), and a sign Fb represents a movement area for the work vehicle 10 to move. Further, the headland areas Fa and Fc and the movement area Fb are the areas surrounding the work area F1 and the crop V is included in the non-work area where the crop V is not arranged.

Specifically, as illustrated in FIG. 2, the controller 21 includes various processors such as a setting processor 211, a route generation processor 212, and an output processor 213. The controller 21 functions as the aforementioned various processors by executing various processing according to the aforementioned control program by the aforementioned CPU. Further, some or all of the aforementioned processors may be configured by an electronic circuit. The aforementioned control program may be a program to cause a plurality of processors to function as the aforementioned processors.

The setting processor 211 sets and registers information on the work vehicle 10 (hereinafter referred to as work vehicle information), information on the field F (hereinafter referred to as field information), and information on a work (here, the spraying work) (hereinafter referred to as work information).

In the setting processing of the aforementioned work vehicle information, the setting processor 211 sets the information such as the model of the work vehicle 10, the position where the antenna 164 is attached in the work vehicle 10, the type of the work machine (here, the spraying device 14), the size and shape of the work machine, the position of the work machine with respect to the work vehicle 10, the vehicle speed and engine speed during work of the work vehicle 10, and the vehicle speed and engine speed during turning of the work vehicle 10, by the operator performing an operation to register the information on the operation terminal 20. In the present embodiment, information on the spraying device 14 is set as information on a work machine.

In the setting processing of the aforementioned field information, the setting processor 211 sets the information such as the position and shape of the field F, the work start position S to start a work and the work end position G to finish the work (see FIG. 6), and the work direction, by the operator performing an operation to register the information on the operation terminal 20. The work direction means the direction where the work vehicle 10 travels while performing a spraying work with the spraying device 14 in the work area F1 which is the area of the field F excluding the non-work area such as the headland area Fa.

Information on the position and shape of the field F can be acquired automatically, for example, by the operator manually driving the work vehicle 10 along the perimeter of the field F by one round and recording the transition of the position information of the antenna 164 at that time. Further, the position and shape of the field F can also be acquired on the basis of a polygon obtained by specifying multiple points on a map by the operator operating the operation terminal 20 while the map is displayed on the operation terminal 20. The area identified by the acquired position and shape of the field F is the area where the work vehicle 10 can travel (travel area).

In the setting processing of the aforementioned work information, the setting processor 211 is configured to be able to set the number of skips which is the number of work routes to be skipped when the work vehicle 10 turns in the headland, the width of the headland, and the like, as the work information.

The route generation processor 212 generates a target route R, which is a route where the work vehicle 10 travels autonomously, on the basis of each of the aforementioned setting information. The target route R is, for example, a route from the work start position S to the work end position G. The route generation processor 212 generates the target route R in the first route generation mode in the case of the field F where a sufficient turning area can be secured, and generates the target route R in the second route generation mode in the case of the field F where a sufficient turning area cannot be secured. In other words, the route generation processor 212 sets the route generation mode to generate the target route R to the first route generation mode or the second route generation mode on the basis of the shape of the field F, to perform the route generation processing that generates the target route R. The route generation processor 212 is an example of the route generation processor of the present invention.

Here, an example of the generation method of the target route R (see FIG. 6) in the first route generation mode will be described. The target route R illustrated in FIG. 6 includes a straight work route R1 for spraying a chemical solution on the crop V in the area (work area F1) where the crop V is planted, and a movement route R2 for moving between the crop rows Vr without spraying in the area where crop V is not planted (headland area Fa).

Figure 7A:
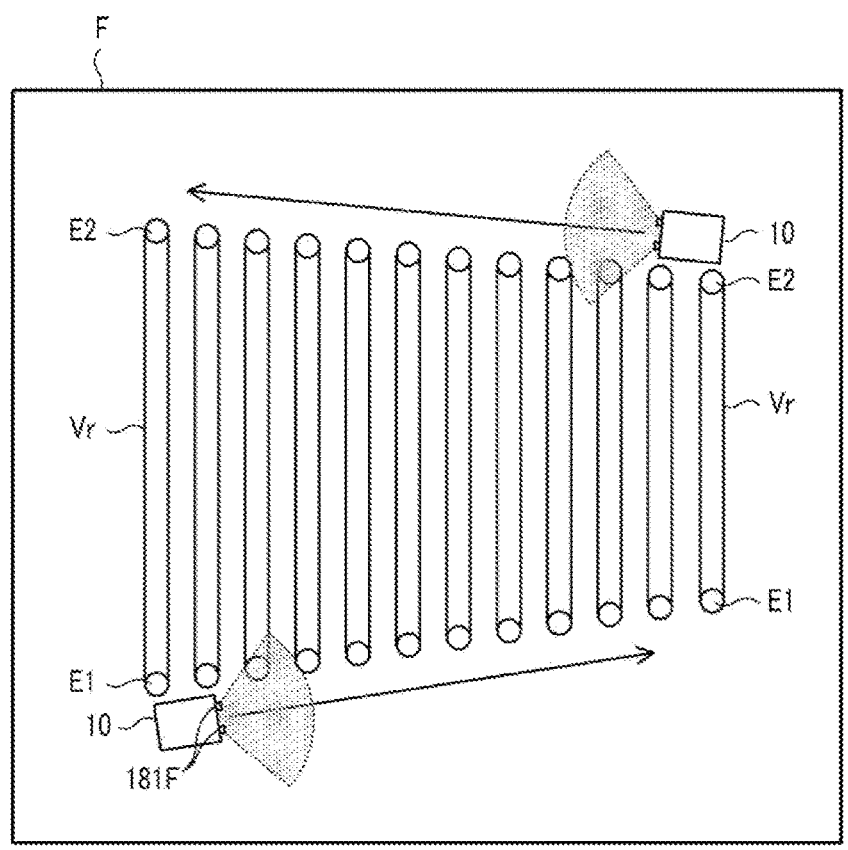
FIG. 7A is a diagram for explaining a method for generating the target route according to the embodiment of the present invention.
Figure 7B:
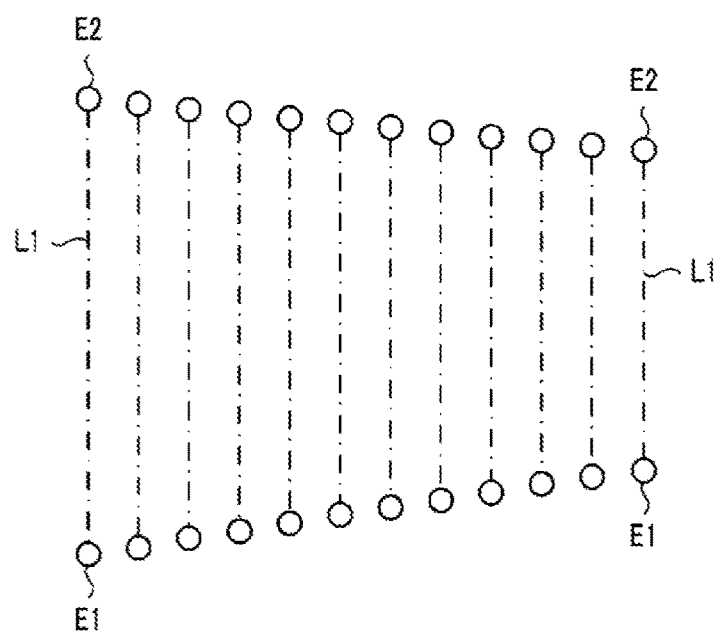
FIG. 7B is a diagram for explaining a method for generating the target route according to the embodiment of the present invention.

FIGS. 7A and 7B illustrate an overview of a method for generating the target route R in the first route generation mode. FIG. 7A schematically illustrates a crop row Vr. First, the operator manually drives the work vehicle 10 along the perimeter of the crop row Vr (see FIG. 7A). The work vehicle 10 detects an end point E1 on one side (bottom side in FIG. 7A) and an end point E2 on the other side (top side in FIG. 7A) of each crop row Vr while traveling and acquires position information (coordinates) of the respective end point E1 and E2. The end points E1 and E2 may be the location of a crop V that has already been planted or the location of a target that indicates the location of a crop V that will be planted in the future. When acquiring the position information (coordinates) of the respective end point E1 and E2 from the work vehicle 10, the route generation processor 212 sets a line L1 (see FIG. 7B) connecting the corresponding end points E1 and E2 to the work route R1 of the crop row Vr, and generates a target route R including a plurality of work routes R1 and a movement route R2 (turning route). Further, the route generation processor 212 generates a target route R where the work vehicle 10 reciprocates on the plurality of work routes R1 in the work area F1 and turns 180 degrees in the headland area Fa. The route generation processor 212 may store the generated target route R in the storage 22.

Next, an example of the generation method of the target route R in the second route generation mode will be described using the field F illustrated in FIG. 8 as an example. Here, the route generation processor 212 generates the target route R in the second route generation mode when the information on the field F and the work vehicle 10 fulfills a predetermined condition. Specifically, the route generation processor 212 generates the target route R in the second route generation mode when the following conditional expression is fulfilled.

$$D < 1.5L + W/2 + r$$

Figure 9:
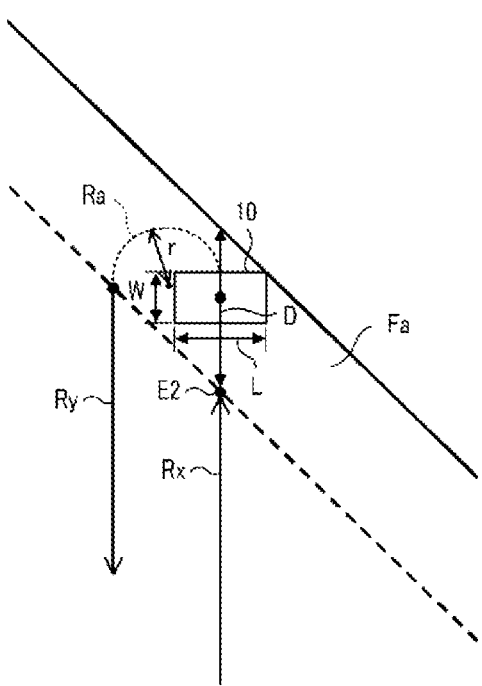
FIG. 9 is a diagram for explaining a condition for switching the route generation mode according to the embodiment of the present invention.

FIG. 9 schematically illustrates a relation between the work vehicle 10 and the headland area Fa. FIG. 9 illustrates how the work vehicle 10 finishes the work of a work route Rx (first crop row Vr), turns a turning route Ra in the headland area Fa, and moves to a next work route Ry (second crop row Vr). In the above conditional expression, "D" indicates the width of the headland area Fa, "L" indicates the overall length of the work vehicle 10, "W" indicates the width of the work vehicle 10, and "r" indicates the turning radius of the work vehicle 10. The turning start position of the work vehicle 10 is set at a position half the length (0.5L) of the total length of the work vehicle 10 from the end point E2 (end point) of the crop row Vr.

If the above conditional expression is fulfilled, the work vehicle 10 cannot make a 180-degree turn in the headland area Fa, and may deviate out of the field. Accordingly, the route generation processor 212 generates the target route R in the second route generation mode when the above conditional expression is fulfilled. In other words, the route generation processor 212 generates the target route R (see FIG. 6) in the first route generation mode when the above conditional expression is not fulfilled, and generates the target route R (see FIG. 10) in the second route generation mode when the above conditional expression is fulfilled.

Figure 10:
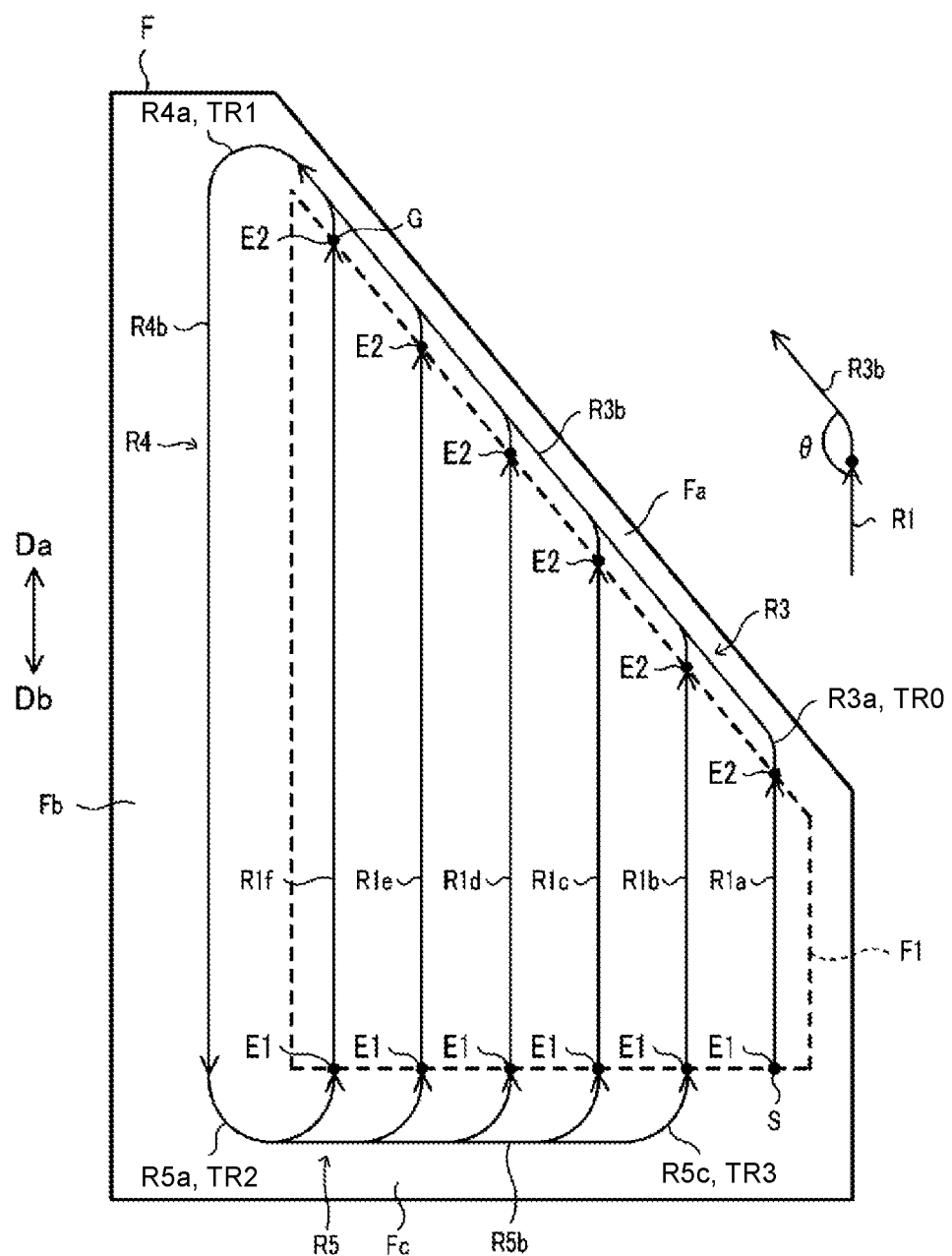
FIG. 10 is a diagram illustrating an example of a target route in a second route generation mode according to the embodiment of the present invention.

FIG. 10 illustrates an example of the target route R in the second route generation mode. The route generation processor 212 accepts operations to specify the work start position S and the work end position G from the operator on the operation screen, and sets the work start position S and the work end position G on the basis of the operations.

Further, the route generation processor 212 generates a plurality of work routes R1 (work routes R1a to R1f in FIG. 10) where the work vehicle 10 travels straight in a first direction Da that is a travel direction of the work vehicle 10, in the work area F1. As in the method for generating the work route R1 of the target route R by the first route generation mode (see FIGS. 7A and 7B), the route generation processor 212 generates a plurality of work routes R1 in one direction (first direction Da) by a line connecting the end points E1 and E2 of each crop row Vr.

Further, the route generation processor 212 generates a movement route R3 (corresponding to the first movement route of the present invention) that is continuous with the work route R1, in the headland area Fa (corresponding to the first non-work area of the present invention) adjacent to the work area F1 in the first direction Da, in non-work areas surrounding the work area F1, where the crop V is not arranged. The movement route R3 includes a turning route R3a that connects to the work route R1 and a straight route R3b that connects to the turning route R3a. Further, the straight route R3b extends in a direction inclined at a predetermined angle θ with respect to the first direction Da.

Further, the route generation processor 212 generates a movement route R4 (corresponding to the second movement route of the present invention) that is a single route continuous with the movement route R3 and that guides the work vehicle 10 to each of the plurality of work routes R1 (work routes R1a to R1f). The movement route R4 includes a turning route R4a that connects to the straight route R3b and a straight route R4b that connects to the turning route R4a. Further, the movement route R4 is included in the movement area Fb (corresponding to the second non-work area of the present invention) adjacent to the work area F1 in a direction orthogonal to the first direction Da, in the non-work areas. Further, the straight route R4b extends in a second direction Db that is a direction opposite to the first direction Da.

Further, the route generation processor 212 generates a movement route R5 that is continuous with the movement route R4 and that connects to each of the plurality of work routes R1 (work routes R1a to R1f). The movement route R5 includes a turning route R5a that connects to the straight route R4b, a straight route R5b that connects to the turning route R5a, and a turning route R5c that connects to the straight route R5b and the work route R1. Further, the movement route R5 is included in a headland area Fc adjacent to the work area F1 in the second direction Db, in the non-work areas. Further, the straight route R5b extends in a direction orthogonal to the first direction Da and the second direction Db. The headland area Fc illustrated in FIG. 10 may have a width that does not fulfill the above conditional expression.

Further, the route generation processor 212 sets a turning radius TR0 of the turning route R3a, a turning radius TR1 of the turning route R4a, a turning radius TR2 of the turning route R5a, and a turning radius TR3 of the turning route R5c. For example, the route generation processor 212 accepts an operation to select a turning radius from the operator on the operation screen (corresponding to the user operation of the present invention). In addition, the route generation processor 212 sets the turning radius of each turning route on the basis of the operator's selection operation. Here, the angle θ between the work route R1 and the straight route R3b is greater than 90 degrees. In this case, the route generation processor 212 sets the turning radius TR0 of the turning route R3a to a value smaller than the turning radius TR1 of the turning route R4a, the turning radius TR2 of the turning route R5a, and the turning radius TR3 of the turning route R5c. In other words, the route generation processor 212 turns the work vehicle 10 by setting the turning radius to a smaller value in the headland area Fa where a sufficient turning area cannot be secured.

The method for setting the turning radius is not limited to the above configuration. As another embodiment, the route generation processor 212 may set each turning radius on the basis of the information such as the shape of the field F, the width of the turning area (headland area Fa), and the size and shape of the work vehicle 10. In other words, the route generation processor 212 may automatically set each turning radius without the aforementioned user operation.

In this way, in the second route generation mode, the route generation processor 212 generates the target route R including the work route R1, movement route R3, R4, and R5 (see FIG. 10) where the work vehicle 10 travels autonomously from the work start position S to the work end position G. The work vehicle 10 autonomously travels along the generated target route R. In other words, when traveling in the work area F1, the work vehicle 10 travels on the work routes R1a to Rif in the first direction Da in sequence and repeatedly travel the same movement route R4 (straight route R4b) when traveling in the movement area Fb, thereby traveling around the field F. In this way, the work vehicle 10 travels around by traveling in sequence on the work routes R1a to R1f as approach routes and traveling on the movement route R4 as a fixed return route.

Further, the route generation processor 212 sets the travel speed of the work vehicle 10 traveling along the target route R. Specifically, the route generation processor 212 sets the travel speed of the work vehicle 10 traveling along the movement routes R3, R4, and R5 to a speed according to the length of the movement route. For example, the route generation processor 212 sets the travel speed to be faster as the length of the straight route included in the movement route is longer. For example, if the travel speed for the work route R1 is V1, the travel speed for the straight route R3b is V3, the travel speed for the straight route R4b is V4, and the travel speed for the straight route R5b is V5, then the travel speeds V3, V4, and V5 are set to be higher than V1. Further, if the length of the straight route R4b is longer than the straight route R3b or the straight route R5b, the travel speed V4 is set to be higher than the travel speed V3 or V5. This makes it possible to shorten the travel time compared to the case where the travel speeds for the movement routes R3, R4, and R5 are set uniformly (same speed), thereby improving work efficiency.

As described above, the route generation processor 212 generates the target route R in the first route generation mode when the field F does not fulfill the aforementioned conditional expression, and generates the target route R in the second route generation mode when at least part of the headland area of the field F fulfills the aforementioned conditional expression.

The output processor 213 outputs route data including information on the target route R generated by the route generation processor 212 to the work vehicle 10. The output processor 213 may output the route data to a server (not illustrated). The aforementioned server stores and manages a plurality of the route data to be acquired from each of the plurality of operation terminals 20, in association with the operation terminals 20 and the work vehicle 10.

In addition to the processing described above, the controller 21 executes the processing of displaying various types of information on the operation acceptor/displayer 23. For example, the controller 21 displays, on the operation acceptor/displayer 23, a registration screen for registering work vehicle information, field information, work information, and the like, an operation screen for generating the target route R, an operation screen for causing the work vehicle 10 start autonomous traveling, a display screen for displaying the traveling state of the work vehicle 10, or the like.

Further, the controller 21 accepts various operations from the operator. Specifically, the controller 21 accepts, from the operator, a work start instruction to start work on the work vehicle 10, a travel stop instruction to stop the travel of the work vehicle 10 during autonomous travel, or the like. Upon receipt of each of the aforementioned instructions, the controller 21 outputs each of the aforementioned instructions to the work vehicle 10.

Upon receipt of the work start instruction from the operation terminal 20, the vehicle control device 11 of the work vehicle 10 starts the autonomous traveling and the spraying work of the work vehicle 10. Further, upon receipt of the travel stop instruction from the operation terminal 20, the vehicle control device 11 stops the autonomous traveling and the spraying work of the work vehicle 10.

The operation terminal 20 may be able to access the website of the agricultural support service provided by the server (agricultural support site) via the communication network N1. In this case, the operation terminal 20 can function as a terminal for operating the server by executing a browser program by the controller 21.

[Autonomous Travel Processing]

Figure 11:
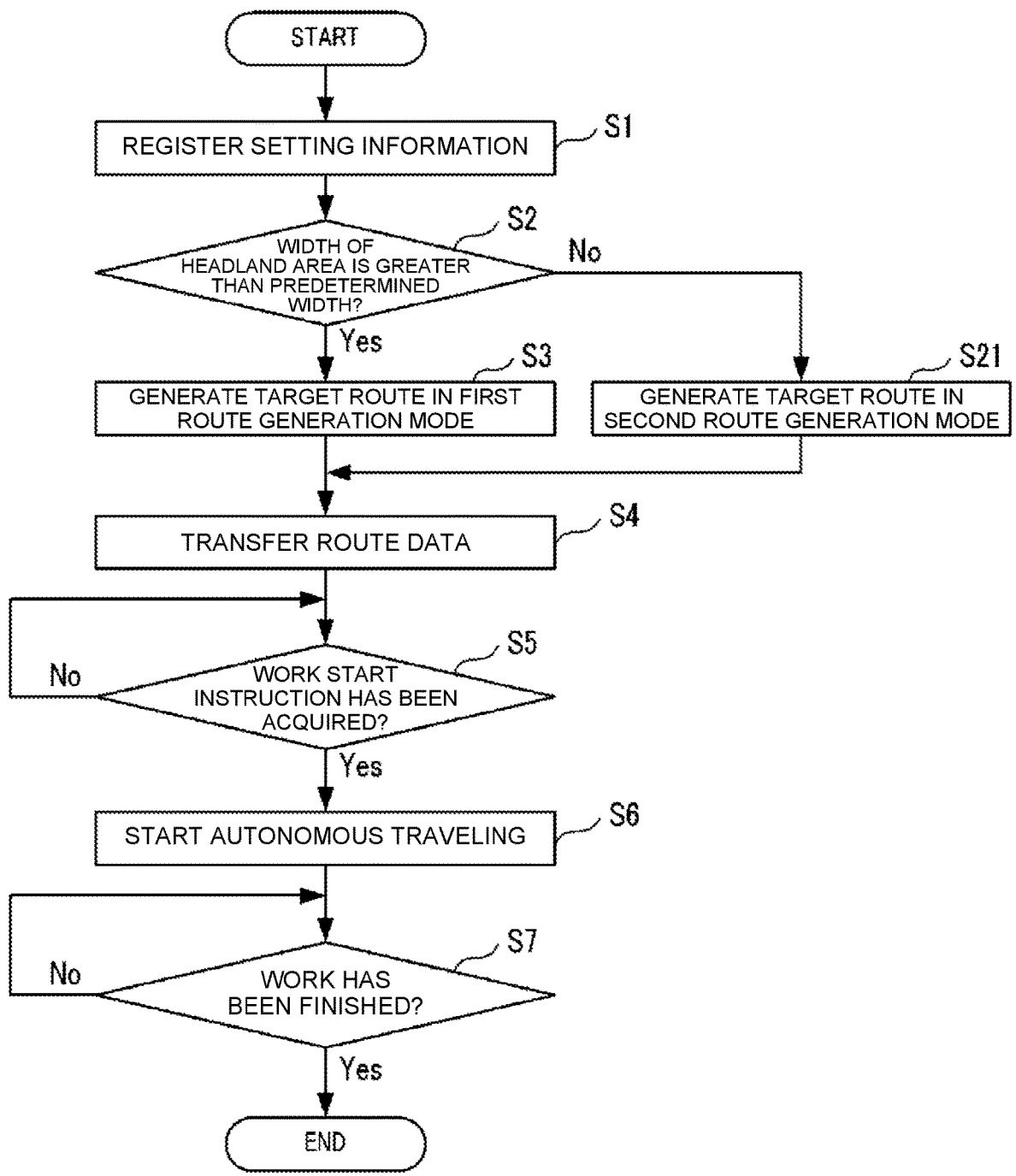
FIG. 11 is a flowchart illustrating an example of a procedure of autonomous travel processing executed by the autonomous travel system according to the embodiment of the present invention.

With reference to FIG. 11, an example of the autonomous travel processing executed by the controller 21 of the operation terminal 20 and the vehicle control device 11 of the work vehicle 10 is described below.

The present invention can be viewed as an invention of an autonomous traveling method that executes one or more steps included in the aforementioned autonomous travel processing. Further, one or more steps included in the aforementioned autonomous travel processing described here may be appropriately omitted. Each step in the aforementioned autonomous travel processing may be executed in a different order as long as the same effect is obtained. Furthermore, although a case where the controller 21 and the vehicle control device 11 execute each step in the aforementioned autonomous travel processing is described here as an example, an autonomous traveling method in which one or more processors execute each step in the autonomous travel processing in a distributed manner is also considered as another embodiment. The aforementioned autonomous travel processing includes route generation processing executed by the controller 21 of the operation terminal 20. Further, the aforementioned autonomous traveling method includes the route generation method of the present invention.

In step S1, the controller 21 of the operation terminal 20 registers various setting information. Specifically, the controller 21 sets and registers information on the work vehicle 10 (work vehicle information), information on the field F (field information), and information on a work (work information), on the basis of the operator's setting operations.

Next, in step S2, the controller 21 determines whether the width of the headland area of the field F is greater than a predetermined width. For example, in the field F illustrated in FIG. 8, the controller 21 determines whether a width D (see FIG. 9) of the headland area Fa is greater than or equal to than a predetermined width ($1.5L+W/2+r$) on the basis of the aforementioned field information. If the width D of the headland area Fa is greater than or equal to the predetermined width (S2: Yes), the processing proceeds to step S3. On the other hand, if the width D of the headland area Fa is less than the predetermined width (S2: No), the processing proceeds to step S21. The field F illustrated in FIG. 6 represents a field where the width D of the headland area Fa is equal to or greater than a predetermined width, and the field F illustrated in FIG. 8 represents a field where the width D of the headland area Fa is less than the predetermined width.

In step S3, the controller 21 generates the target route R in the first route generation mode. For example, when an operation to specify the work start position S and the work end position G in the field F illustrated in FIG. 6 is received from the operator, the controller 21 generates the target route R including the plurality of work routes R1 for reciprocating the work vehicle 10 in the work area F1 and the movement route R2 for turning the work vehicle 10 180 degrees in the headland areas Fa and Fc. After step S3, the processing proceeds to step S4.

In contrast, in step S21, the controller 21 generates the target route R in the second route generation mode. For example, when an operation to specify the work start position S and the work end position G in the field F illustrated in FIG. 8 is received from the operator, the controller 21 generates the target route R including the plurality of work routes R1 where the work vehicle 10 travels in one direction (first direction Da) in the work area F1, the movement route R3 that includes the straight route R3b where the work vehicle 10 travels straight in the headland area Fa, the movement route R4 that is a single route continuous with the movement route R3 and that includes the straight route R4b where the work vehicle 10 travels straight in one direction (second direction Db), and the movement route R5 that is a route continuous with the movement route R4 and that causes the work vehicle 10 to enter each work route R1 (work routes 111a to R1f).

The movement route R4 is set in the movement area Fb of the non-work area, and the straight route R4b included in the movement route R4 extends in the second direction Db that is a direction opposite to the first direction Da. After step S21, the processing proceeds to step S4.

In step S4, the controller 21 transfers the route data of the target route R to the work vehicle 10. When acquiring the aforementioned route data, the vehicle control device 11 of the work vehicle 10 stores same in the storage 12.

Next, in step S5, the vehicle control device 11 determines whether a work start instruction has been acquired from the operation terminal 20. For example, when the operator presses the start button on the operation terminal 20, the operation terminal 20 outputs a work start instruction to the work vehicle 10. When the vehicle control device 11 acquires the work start instruction from the operation terminal 20 (S5: Yes), the processing proceeds to step S6. The vehicle control device 11 waits until acquiring the work start instruction from the operation terminal 20 (S5: No).

In step S6, the vehicle control device 11 starts autonomous traveling along the target route R according to the aforementioned route data. For example, in the field F illustrated in FIG. 6, the work vehicle 10 autonomously travels along the target route R generated in the first route generation mode. Further, for example, in the field F illustrated in FIG. 10, the work vehicle 10 autonomously travels along the target route R generated in the second route generation mode.

Next, in step S7, the vehicle control device 11 determines whether the work vehicle 10 has finished the work. The vehicle control device 11 determines that the work has been finished when the position of the work vehicle 10 coincides with the work end position G. When the work vehicle 10 has finished the work (S7: Yes), the above autonomous travel processing ends. The vehicle control device 11 repeats the processing of step S7 until the work vehicle 10 finishes the work and continues autonomous traveling.

As described above, the autonomous travel system 1 according to the present embodiment generates the plurality of work routes R1 where the work vehicle 10 travels straight in the first direction Da that is a travel direction of the work vehicle 10, in the work area F1 where the work object (crop V) is arranged, generates the movement route R3 that is a route continuous with the work route R1 and that includes the straight route R3b where the work vehicle 10 travels straight, in the first non-work area (headland area Fa) adjacent to the work area F1 in the first direction Da, in non-work areas surrounding the work area F1, where the aforementioned work object is not arranged, and generates the movement route R4 that is a single route continuous with the movement route R3 and that guides the work vehicle 10 to each of the plurality of work routes R1.

Further, an autonomous travel method (route generation method) according to the present embodiment is a method in which one or more processors execute generating the plurality of work routes R1 where the work vehicle 10 travels straight in the first direction Da that is a travel direction of the work vehicle 10, in the work area F1 where the work object (crop V) is arranged, generating the movement route R3 that is a route continuous with the work route R1 and that includes the straight route R3b where the work vehicle 10 travels straight, in the first non-work area (headland area Fa) adjacent to the work area F1 in the first direction Da, in non-work areas surrounding the work area F1, where the aforementioned work object is not arranged, and generating the movement route R4 that is a single route continuous with the movement route R3 and that guides the work vehicle 10 to each of the plurality of work routes R1.

According to the above configuration, for example, as illustrated in FIG. 10, in a case where the headland area Fa has a shape that makes it difficult to turn the work vehicle 10 180 degrees, after the work vehicle 10 has traveled on the work route R1, it is possible to generate the target route R for traveling straight on the straight route R3b without turning 180 degrees in the headland area Fa. Thus, it is possible to generate the target route R appropriately in the field F where a sufficient turning area cannot be secured. In addition, the work vehicle 10 can perform a work while traveling efficiently and autonomously, even in the field F where a sufficient turning area cannot be secured.

The present invention is not limited to the above-described embodiment. Other embodiments of the present invention will be described below.

Figure 12:
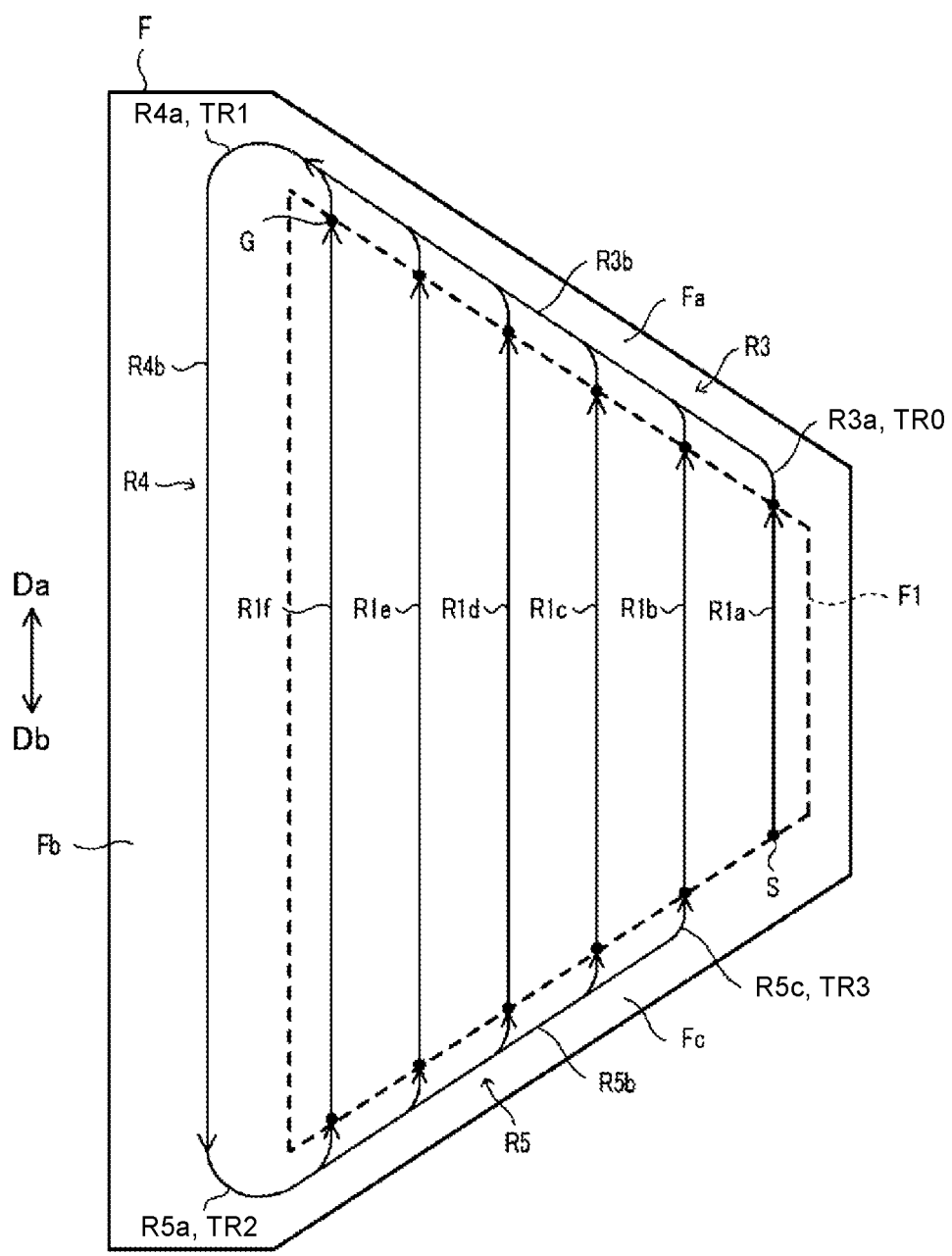
FIG. 12 is a diagram illustrating another example of the target route in the second route generation mode according to the embodiment of the present invention.

For example, the field F illustrated in FIG. 12 is a field where both the headland area Fa adjacent to the first direction Da and the headland area Fc adjacent to the second direction Db with respect to the work area F1 fulfill the above conditional expression. In this case, as another embodiment of the present invention, the route generation processor 212 generates a movement route R5 which connects to the work route R1, in the headland area Fc adjacent to the work area F1 in the second direction Db, in non-work areas surrounding the work area F1, where the crop V is not arranged. The movement route R5 includes a turning route R5a that connects to the straight route R4b of the movement route R4 and a straight route R5b that connects to the turning route R5c. Further, the straight route R5b extends in a direction inclined at a predetermined angle θ with respect to the first direction Da.

Further, the route generation processor 212 sets the turning radius TR3 of the turning route R5c to a value smaller than the turning radius TR1 of the turning route R4a and the turning radius TR2 of the turning route R5a. In this way, the route generation processor 212 generates the target route R in the second route generation mode when at least a part of the headland area of the field F fulfills the aforementioned conditional expression.

Figure 13:
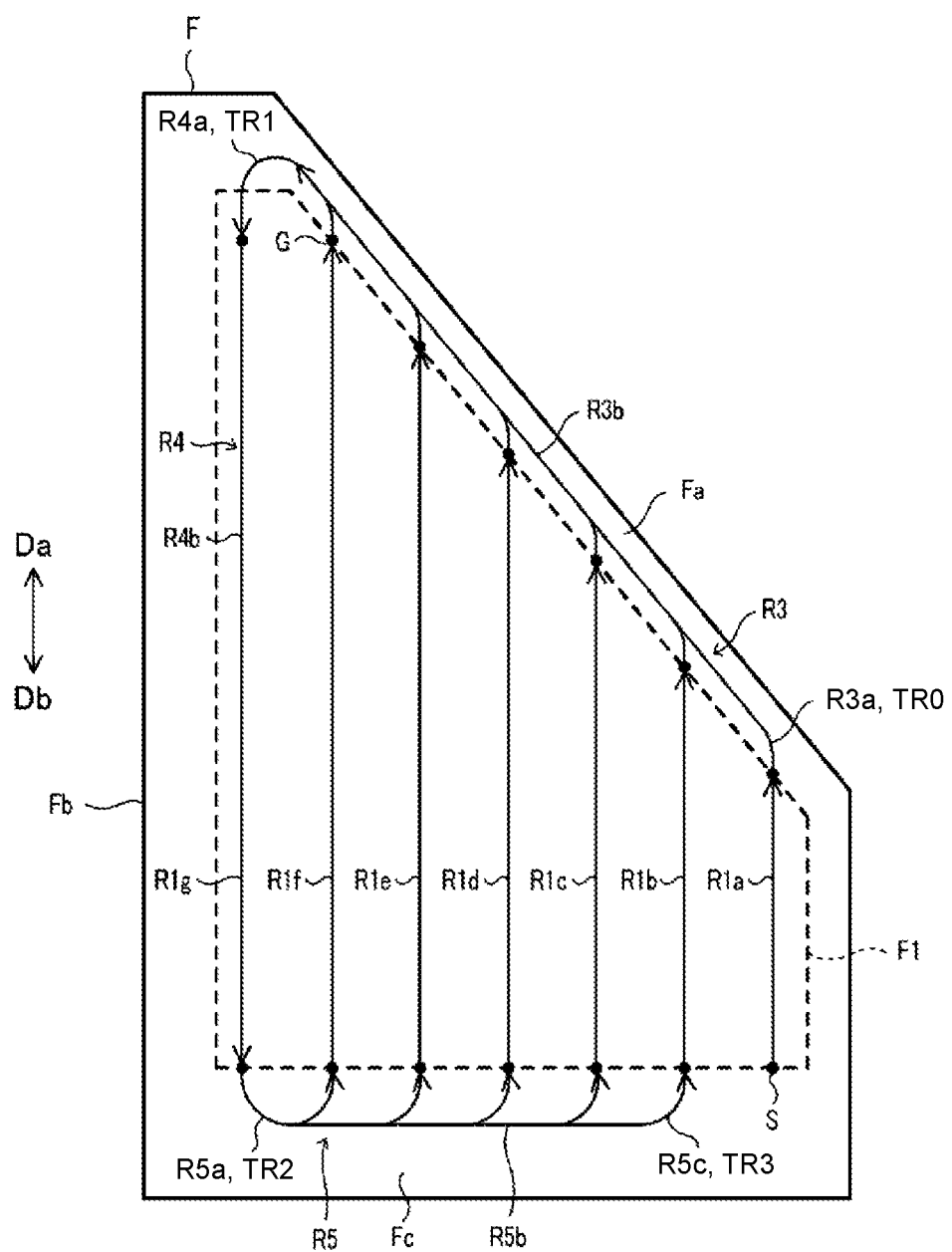
FIG. 13 is a diagram illustrating another example of the target route in the second route generation mode according to the embodiment of the present invention.

As another embodiment of the present invention, the movement route R4 (return route) that connects to the movement route R3 included in the headland area Fa where it is difficult for the work vehicle 10 to make a 180-degree turn may be included in the work area F1. In other words, the straight route R4b included in the movement route R4 may be one of the work routes R1. For example, as illustrated in FIG. 13, the straight route R4b is the work route Rig located at the end of the work area F1 in the plurality of work routes R1. As a result, when traveling in the work area F1, the work vehicle 10 travels on the work routes R1a to Rif in the first direction Da in sequence and repeatedly travel the same movement route R4 (work route R1g), thereby traveling around the field F. In this way, the work vehicle 10 travels around by traveling in sequence on the work routes R1a to R1f as approach routes and traveling on the work route R1g as a fixed return route.

In the target route R illustrated in FIG. 13, the work vehicle 10 performs the spraying work when traveling on the work route R1g for the first time and does not perform the spraying work when traveling on the work route R1g for the second and subsequent times. Further, the work vehicle 10 may set the travel speed for the second and subsequent travels on the work route R1g to a higher speed than that for the first travel.

In each of the above embodiments, the operation terminal 20 alone corresponds to the route generation device according to the present invention, but the route generation device according to the present invention may include one or more components of the operation terminal 20 and the server (not illustrated). For example, the aforementioned server alone may constitute the route generation device according to the present invention.

REFERENCE SIGNS LIST

1: autonomous travel system
10: work vehicle
11: vehicle control device
14: spraying device
16: positioning device
17: obstacle detection device
20: operation terminal (route generation device)
211: setting processor
212: route generation processor
213: output processor
40: base station
50: satellite
F: field
F1: work area
R: target route
R1: work route
R2: movement route
R3: movement route (first movement route)
R3b: straight route
R4: movement route (second movement route)
R4b: straight route
Fa: headland area (first non-work area)
Fb: movement area (second non-work area)
V: crop (work object)
Vr: crop row
Da: first direction
Db: second direction

The invention claimed is:

1. An autonomous travel system for a route generation comprising:
a work vehicle having an autonomous traveling controller, mounted on the work vehicle, executing and traveling on a plurality of work routes where the work vehicle travels straight in a first direction that is a travel direction of the work vehicle, in a work area where a work object is arranged;
wherein
the work vehicle having the controller, executes and travels on a first movement route that is a route continuous with at least one of the plurality of work routes and that includes a straight route, in a first non-work area adjacent to the work area in the first direction, in non-work areas surrounding the work area, where the work object is not arranged; and
the work vehicle having the controller, executes and travels on a second movement route that is a single route continuous with the first movement route and that guides the work vehicle to each of the plurality of work routes.

2. The autonomous travel system for a route generation according to claim 1, wherein the second movement route includes a straight route where the work vehicle travels straight in a second direction that is a direction opposite to the first direction.

3. The autonomous travel system for a route generation according to claim 1, wherein the second movement route is included in a second non-work area adjacent to the work area in a direction orthogonal to the first direction, in the non-work areas.

4. The autonomous travel system for a route generation according to claim 1, wherein the second movement route is a work route located at an end of the work area in the plurality of work routes.

5. The autonomous travel system for a route generation according to claim 1, wherein the straight route included in the first movement route extends in a direction inclined with respect to the first direction.

6. The autonomous travel system for a route generation according to claim 1, wherein a turning radius of a turning route included in the first movement route is set to a smaller value than a turning radius of a turning route included in the second movement route.

7. The autonomous travel system for a route generation according to claim 6, wherein a user operation to select a turning radius of a turning route is accepted, and the turning radius of the turning route included in the first movement route and the turning radius of the turning route included in the second movement route are set on a basis of the user operation.

8. The autonomous travel system for a route generation according to claim 1, wherein a travel speed of the work vehicle traveling on the second movement route is set to a speed according to a length of the second movement route.

9. The autonomous travel system for a route generation according to claim 1, wherein the work vehicle is a vehicle that can perform a spraying work in which a sprayed object is sprayed on a first work object and a second work object in each of the right-left directions of the first work object while traveling over the first work object.

10. An autonomous travel system for a route generation comprising:
a work vehicle; and
an operation terminal having a route generation processor that generates in an autonomous traveling controller, mounted on the work vehicle,
wherein
the work vehicle travels on a plurality of work straight in a first direction that is a travel direction of the work vehicle, in a work area where a work object is arranged;
the work vehicle travels on a first movement route that is a route continuous with at least one of the plurality of work routes and that includes a straight route, in a first non-work area adjacent to the work area in the first direction, in non-work areas surrounding the work area, where the work object is not arranged; and
the work vehicle travels on a second movement route that is a single route continuous with the first movement route and that guides the work vehicle to each of the plurality of work routes.

11. An autonomous travel system comprising:
a work vehicle; and
an operation terminal containing a route generation program for causing one or more processors in an autonomous traveling controller, mounted on the work vehicle, to execute wherein:
the work vehicle with the controller, executes and travels on a plurality of work routes straight in a first direction that is a travel direction of the work vehicle, in a work area where a work object is arranged;
the work vehicle with the controller, executes and travels on a first movement route that is a route continuous with at least one of the plurality of work routes and that includes a straight route where the work vehicle travels straight, in a first non-work area adjacent to the work area in the first direction, in non-work areas surrounding the work area, where the work object is not arranged; and
the work vehicle with the controller, executes and travels on a second movement route that is a single route continuous with the first movement route and that guides the work vehicle to each of the plurality of work routes.

* * * * *